(12) United States Patent
Chanvillard et al.

(10) Patent No.: US 12,510,564 B2
(45) Date of Patent: Dec. 30, 2025

(54) METHOD FOR MANUFACTURING AN ELECTRIC COMPONENT

(71) Applicant: Schneider Electric Industries SAS, Rueil-Malmaison (FR)

(72) Inventors: Christophe Chanvillard, Eybens (FR); Loïc Rondot, Meylan (FR); Lionel Urankar, Neuchâtel (CH)

(73) Assignee: Schneider Electric Industries SAS, Rueil-Malmaison (FR)

( * ) Notice: Subject to any disclaimer, the term of this patent is extended or adjusted under 35 U.S.C. 154(b) by 489 days.

(21) Appl. No.: 17/919,443

(22) PCT Filed: Apr. 22, 2021

(86) PCT No.: PCT/EP2021/060520
§ 371 (c)(1),
(2) Date: Oct. 17, 2022

(87) PCT Pub. No.: WO2021/214211
PCT Pub. Date: Oct. 28, 2021

(65) Prior Publication Data
US 2023/0152351 A1 May 18, 2023

(30) Foreign Application Priority Data

Apr. 23, 2020 (FR) .................................. FR2004060

(51) Int. Cl.
*G01R 3/00* (2006.01)
*B23K 26/362* (2014.01)
*G01R 15/18* (2006.01)

(52) U.S. Cl.
CPC .............. *G01R 3/00* (2013.01); *B23K 26/362* (2013.01); *G01R 15/181* (2013.01)

(58) Field of Classification Search
CPC ...... G01R 3/00; G01R 15/181; B23K 26/362; H01F 3/00; H01F 38/20; H01F 41/02
See application file for complete search history.

(56) References Cited

U.S. PATENT DOCUMENTS 6,426,617 B1 * 7/2002 Haensgen ............... H01R 12/52
324/117 R
7,173,417 B1 * 2/2007 Poris .................. G01B 11/0616
324/230

(Continued)

FOREIGN PATENT DOCUMENTS

CA 1296061 C * 2/1992 ............. G01N 27/72
EP 3037829 A1 6/2016

(Continued)

OTHER PUBLICATIONS

French Search Report dated Dec. 18, 2020 for corresponding French Patent Application No. FR 2004060, 2 pages.

(Continued)

*Primary Examiner* — Jeffrey T Carley
(74) *Attorney, Agent, or Firm* — FIG. 1 Patents (57) ABSTRACT

A method for manufacturing an electrical component, comprising: an armature (1) formed by a polymeric plastic material and an organometallic additive and comprising a support arm (4), with a winding (2) formed directly on the surface of the support arm (4) by a conductor track (10) forming turns. According to the invention, in order to obtain a winding with a high density of turns, with a precise arrangement which varies little over time, while making it possible to have a winding design with any desired geometry, the manufacturing method comprises laser engraving of the support arm (4), for engraving an initiator track forming the turns of the winding (2) and where the organometallic additive is locally activated. The method then comprises (Continued)

metallizing the initiator track with a conducting metal so to form the conductor track (10) according to the turns formed by the initiator track.

10 Claims, 7 Drawing Sheets

(56) References Cited

U.S. PATENT DOCUMENTS

| | | | | |
|---|---|---|---|---|
| 9,087,636 | B2* | 7/2015 | Kostelnik | H01F 5/00 |
| 10,732,205 | B2 | 8/2020 | Houbre et al. | |
| 10,732,207 | B2 | 8/2020 | Urankar | |
| 11,169,186 | B2* | 11/2021 | Kashiwaya | G01R 19/32 |
| 11,322,297 | B2* | 5/2022 | Urankar | H01F 27/2804 |
| 12,243,698 | B2* | 3/2025 | Loglisci | H01H 71/0228 |
| 2002/0021532 | A1* | 2/2002 | Lee | G11B 5/4853 |
| | | | | 360/265.9 |
| 2012/0323098 | A1* | 12/2012 | Moein | A61B 5/6848 |
| | | | | 29/832 |
| 2014/0111190 | A1* | 4/2014 | Ryochi | G01R 15/181 |
| | | | | 324/127 |
| 2015/0102802 | A1* | 4/2015 | Park | G01R 15/246 |
| | | | | 324/97 |
| 2016/0178661 | A1* | 6/2016 | Olivier | B23K 26/21 |
| | | | | 324/156 |
| 2017/0146572 | A1 | 5/2017 | Urankar | |
| 2020/0096308 | A1* | 3/2020 | Hughes | G01B 7/06 |

FOREIGN PATENT DOCUMENTS

| | | |
|---|---|---|
| EP | 3171182 A1 | 5/2017 |
| FR | 3053795 A1 | 1/2018 |
| FR | 3075387 A1 | 6/2019 |
| WO | WO-2013001298 A1 * 1/2013 | ........... G01R 15/181 |

OTHER PUBLICATIONS

International Search Report dated May 18, 2021 for corresponding International Patent Application No. PCT/EP2021/060520, 2 pages.

* cited by examiner

METHOD FOR MANUFACTURING AN ELECTRIC COMPONENT

TECHNICAL FIELD

The present invention relates to a method for manufacturing an electrical component and to the electrical component obtainable by such a method.

BACKGROUND

An electric current sensor is used for measuring the value of an electric current flowing through a power line. Such a measurement can be needed for quantifying the power and/or electrical energy consumed by an electrical receiver or for detecting a malfunction in the receiver. It is known how to use as a Rogowski sensor as current sensor which uses one or a plurality of windings of conducting wire about a non-magnetic core, such type of sensor being generally associated with a signal processing circuit including an integrator circuit.

The sensor can be e.g. in the form of a conductor winding which extends along a circular or rectangular trajectory. A toroidal winding e.g. is thus obtained, which forms a loop. During use, the power line the current of which is to be measured, is positioned so as to pass through the loop formed by the winding, at the center of the trajectory. The power line is thus radially encircled by the winding. In order to reduce the disturbances for the measurement, it can be provided so that the winding comprises outgoing turns which are criss-crossed with return turns, or that the return turns are wound inside the outgoing turns or parallel under thereto, or that an unwound part of the conductor, coming out from one end of the winding of the outgoing turns, passes back through the inside of the winding in the opposite direction, along the trajectory of said winding. EP3171182A1 gives a few examples on such topic.

To construct such type of winding, a copper wire is conventionality wound, sometimes around a core made of polymer plastic with a toroidal shape, sometimes on a multilayer printed circuit board, as described in FR 3 075 387 A1.

In order to make the current sensor more compact, FR 3 053 795 A1 provides for the formation of a hybrid sensor, by associating windings with ferromagnetic bars, arranged so as to form openings intended to be crossed by the conductors for which current is to be measured.

The accuracy of the measurement depends in particular on the precision of the geometry of the turns and on the regularity of the spatial arrangement thereof. Moreover, a high number of turns is desirable in order to obtain a significant gain. It is thus necessary to provide complex and expensive machines for winding conducting wire. Furthermore, the coiling of the winding limits the density of turns and the wound conductor is likely to deform during use, e.g. under the effect of thermal stresses. Finally, the coiling method and the type of support used, particularly for the printed circuit board, imposes strong geometric constraints on the shape of the winding and of the sensor.

SUMMARY

The invention thus aims to solve the aforementioned drawbacks of the prior art by proposing a new manufacturing method, aiming at obtaining an electrical component comprising a winding with a high density of turns, a precise arrangement of the turns which is not very variable in time, the manufacturing method making it possible to have a winding design with any desired geometry.

The subject matter of the invention is a manufacturing method for an electrical component, preferentially constituting a current sensor. The electrical component includes an armature, which consists of a material comprising a polymeric plastic material and an organometallic additive, the armature including a support arm which extends along a guiding trajectory. The electrical component further comprises a winding, which is formed directly on the surface of the support arm by a conductor track forming turns of the winding, which are distributed along the guiding trajectory and encircle the guiding trajectory. The manufacturing process successively comprises: providing or manufacturing the armature; laser engraving of the support arm for engraving an initiator track forming the turns of the winding and where the organometallic additive is locally activated; and metallizing the initiator track with a conducting metal so as to form the conductor track directly on the surface of the support arm, according to the turns formed by the initiator track.

A basic idea of the invention is to form the winding by means of the conductor track traced on the support arm of the armature, rather than in the form of a conducting wire as provided in the prior art. The formation of the initiator track by laser engraving and by activating the additive, then by metallization, are used for forming the conductor track with a high resolution and according to any desired geometry. The conductor track can e.g. have a thickness of less than 15 µm, preferentially being formed by a copper deposition produced by metallization, advantageously coated with a nickel barrier and a gold finish, e.g. of about 5 µm. As a result, a particularly high density of turns can be obtained for the winding, leading to a high compactness of the winding and/or a high gain if the winding of the component is used as a sensor. The turns are characterized e.g. by a pitch of less than 400 µm, e.g. of about 200 µm. The layout of the conductor track is very precise since same is essentially determined by the precision of the laser engraving and by the quality of the metallization. It is easy to obtain any desired shape for the winding, since same depends on the layout of the laser engraving and on the shape of the outer surface of the armature, which can easily be shaped by molding during the manufacture thereof. Since the support arm of the armature is a bulk part, the surface area of each turn can easily be relatively high, in particular compared to a winding of the prior art which would be formed around a printed circuit board, by nature relatively not very thick and often leading to designing turns with a flattened shape.

Since the conductor track is intimately linked to the support arm of the armature, same keeps the initial shape thereof over time and is not very sensitive to deformation under the effect of heat, unlike windings consisting of wound conducting wire.

As a result of such high quality of the winding, the electrical component obtained by the manufacturing process is particularly suitable for forming a current sensor, in particular a Rogowski sensor, the armature being advantageously suitable for forming a non-magnetic core.

Other optional and advantageous features of the invention are described hereinafter.

Preferentially, the support arm comprises a first side and a second side, which are opposite and contiguous on both sides of the guiding trajectory, while the laser engraving comprises: laser engraving of a first part of the initiator track on the first side, the first part of the initiator track forming, for each turn, only a first part of the initiator track, and laser engraving of a second part of the initiator track on the second side, only after the engraving of the first part of the initiator track, the second part of the initiator track forming, for each turn, a second part of the turn which completes the first part of said turn.

Preferentially, the laser engraving comprises: positioning of the armature so that the first side is oriented facing a laser engraver, so that the laser engraving of the first part of the initiator track is performed by the laser engraver; and repositioning of the armature so that the second side is oriented facing the laser engraver, so that the laser engraving of the second part of the initiator track is performed by the laser engraver.

Preferentially, the manufacturing of the armature comprises molding the armature by injecting the material into a mold.

Preferentially, the mold comprises: a shaping chamber for shaping the support arm; a first opening for injecting a first portion of the material; a second opening for injecting a second portion of the material; and a joining chamber into which the second opening exits and which communicates with the first opening via the shaping chamber of the support arm. Preferentially, the injection molding comprises: injecting the first portion of the material into the mold through the first opening, such that the first portion of the material: incurs into the shaping chamber of the support arm, the support arm then being entirely formed by the first portion of the material; extends into the joining chamber. The injection molding further comprises injecting of the second portion of the material into the mold through the second opening such that the second part of the material encounters the first portion of the material in the joining chamber, the armature being formed by combining the first portion of the material and the second portion of the material.

Preferentially, the first opening and the second opening are arranged in the same plane and along the same orientation, so that: the first opening shapes a first stud of the armature, by injecting the first portion of the material; and the second opening shapes to a second stud of the armature, by injecting the second portion of the material, the first stud and the second stud being configured for positioning the electrical component on a printed circuit board.

Preferentially, the manufacturing process comprises: manufacturing or providing a bar of ferromagnetic material, and attaching the bar to an attachment arm belonging to the armature, after providing or manufacturing the armature. Preferentially, the molding includes forming the support arm and the attachment arm in the mold, such that the support arm and the attachment arm are formed in a single piece.

Preferentially, the attaching of the bar comprises snap-fitting the bar onto the attachment arm, using supplementary snap-fitting means belonging to the bar and to the attachment arm.

Preferentially, the bar attachment comprises: positioning of the bar onto the attachment arm, with threading of a snap-riveting hole which crosses through the bar, along the snap-riveting pin belonging to the attachment arm; and attaching of the bar thus positioned on the attachment arm by snap-riveting, by melting the snap-riveting pin.

The invention further relates to an electrical component, which can be obtained by means of the manufacturing method defined hereinabove, the electrical component comprising an armature, which is formed by a material comprising a polymeric plastic and an organometallic additive, the armature comprising a support arm which extends along a guiding trajectory. The electrical component further comprises a winding, which is formed directly on the surface of the support arm by a conductor track forming turns of the winding, which are distributed along the guiding trajectory and encircle the guiding trajectory.

Preferentially, the electrical component according to the invention is obtained by using the above-mentioned manufacturing method.

As a variant, the electrical component manufactured by the method described hereinabove is an antenna, rather than a current sensor. For such a variant, the winding is configured for being apt to radiate and/or capture electromagnetic waves. In such a case, the electrical component can be integrated into a radio system.

BRIEF DESCRIPTION OF THE DRAWINGS

The invention will be better understood upon reading the description hereinafter of embodiments of the invention, given only as an example and not limited to, with reference to the drawing enclosed hereinafter.

DETAILED DESCRIPTION

Figure 1:
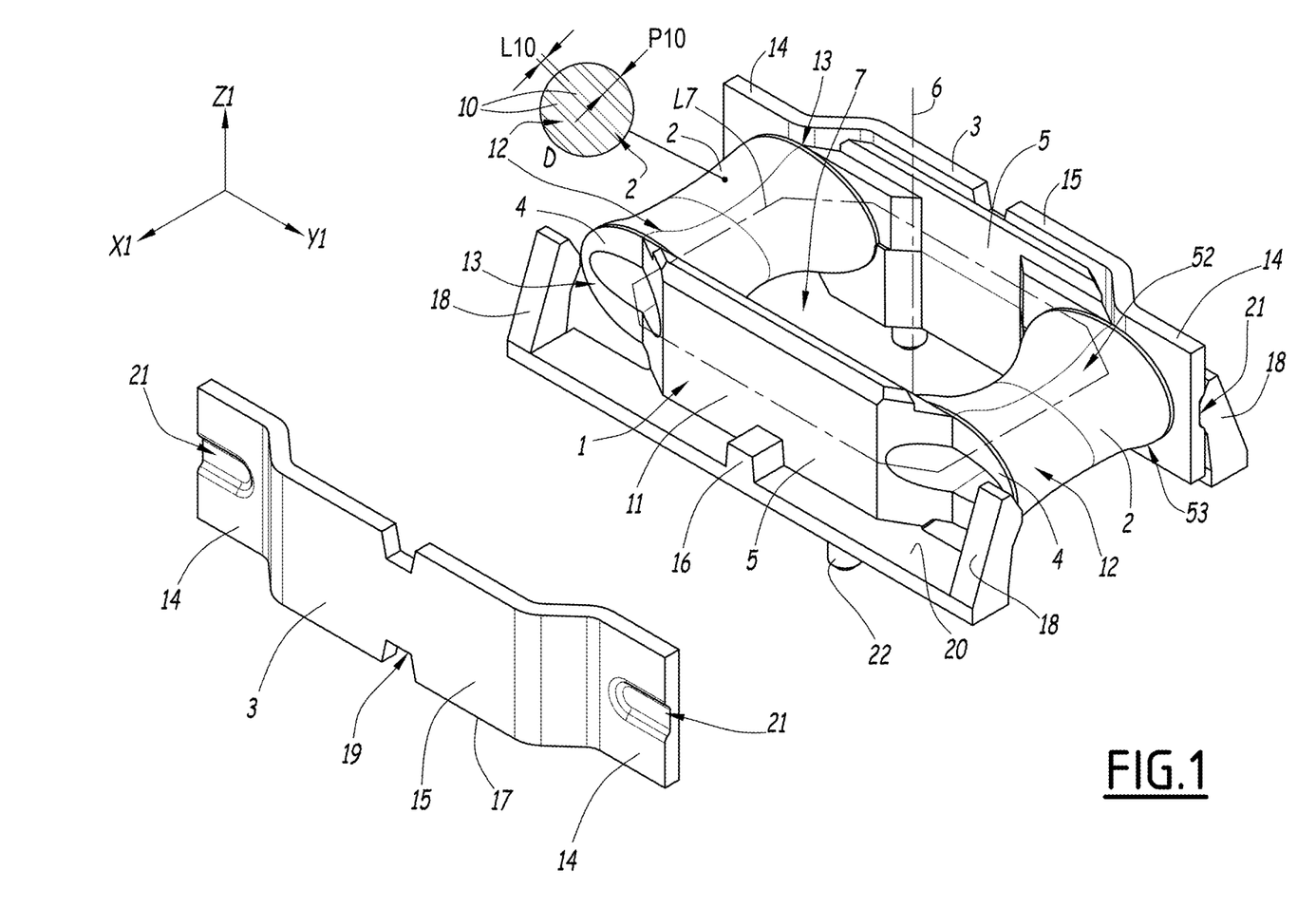
FIG. 1 is an exploded perspective view of an electrical component according to a first embodiment according to the invention.
Figure 2:
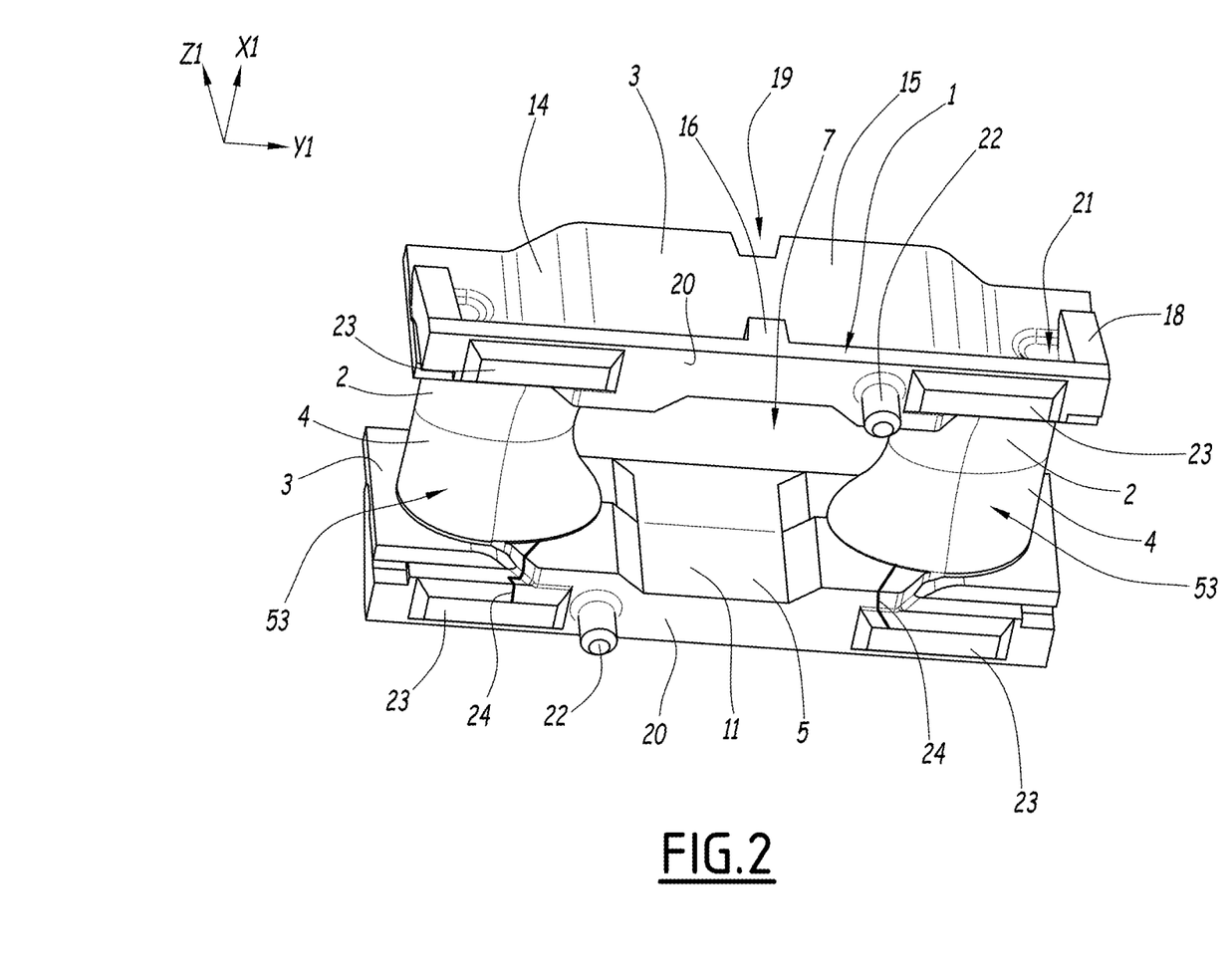
FIG. 2 is a perspective view, from another angle, of the electrical component shown in FIG. 1.
Figure 3:
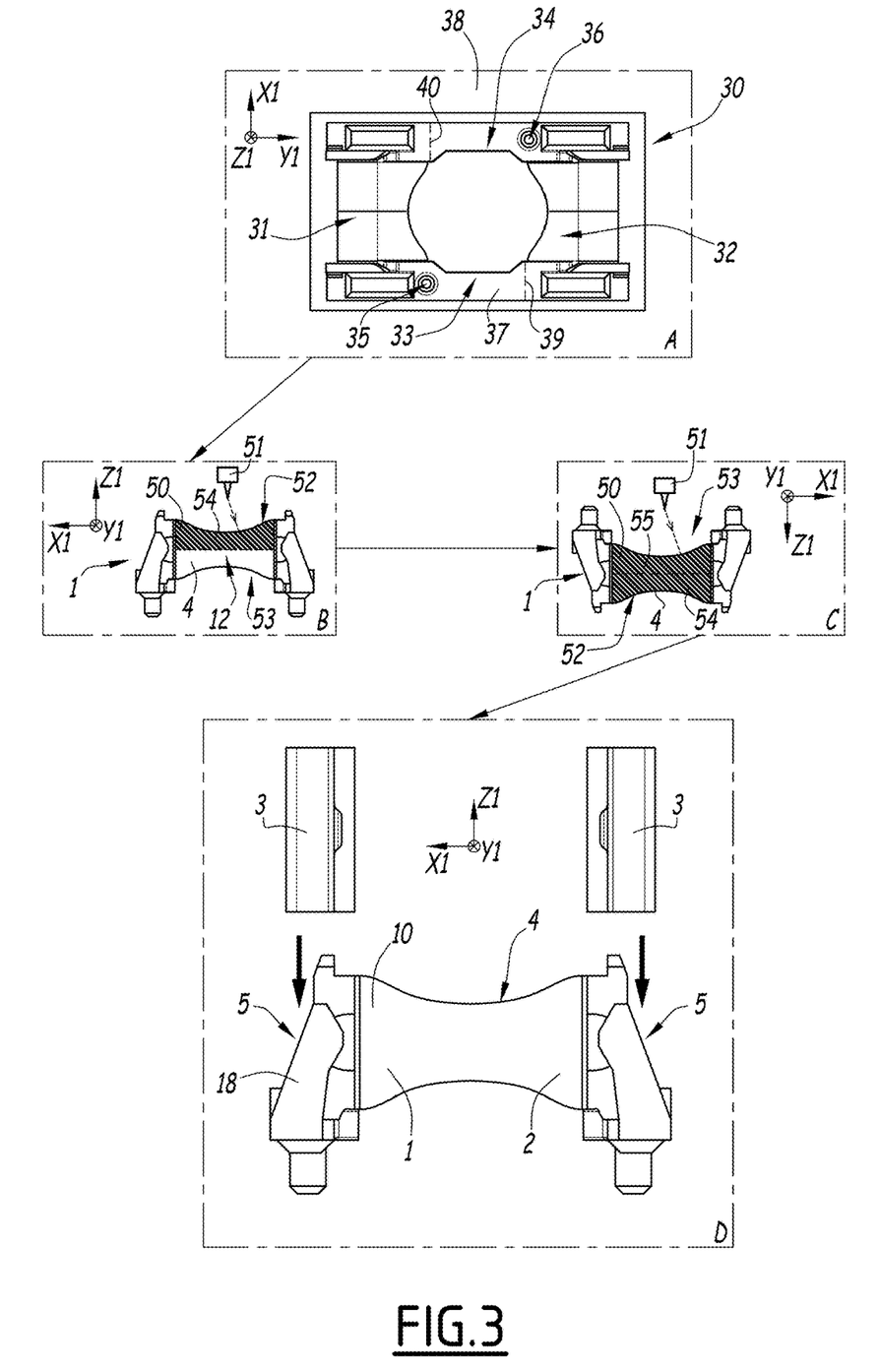
FIG. 3 schematically shows different steps of a manufacturing process for the electrical component of FIGS. 1 and 2.

According to the embodiment shown in FIGS. 1 to 3, the electrical component comprises an armature 1, two windings 2 and two bars 3. A reference mark is used, which includes a longitudinal direction X1, a transverse direction Y1, a direction of height Z1, mutually perpendicular and fixed with respect to the armature 1.

The component shown in FIGS. 1 to 3 preferentially form a current sensor. The value of the current of a conductor 6, essentially parallel to the direction Z1, flowing through a guiding trajectory L7 defined by the component, in the form of a closed loop, inscribed in a plane parallel to the directions X1 and Y1, can be determined by means of the component, a voltage being induced across the terminals of the component as a function of the magnetic flux across said opening 7 along the direction Z1. In practice, the armature 1 delimits an opening 7 of the component, in the same plane as the guiding trajectory L7 and being surrounded by the guiding trajectory L7, through which the conductor 6 can cross. Preferentially, such component is a Rogowski sensor and the induced voltage depends on the value of the variation of the current flowing through the opening 7.

Such component is preferentially intended for being mounted on a printed circuit board (not shown), by using the armature 1, the printed circuit board extending under the component parallel to the directions X1 and Y1. Such component is intended for being connected to an electronic system for sensors, including a conditioning electronic system e.g. in the form of an integrator circuit.

The component, in particular the armature 1, measures e.g. about 25 mm in the direction Y1 and about 15 mm in the direction X1. More generally, the component described herein advantageously has a length of less than 50 mm and a width of less than 40 mm.

The armature 1 is formed, preferentially by forming a single piece consisting of a single piece, i.e in one-piece, entirely of the same material.

The material comprises a polymeric plastic material, which is preferentially a thermoplastic resin, e.g. polycarbonate (PC), which is relatively easy to be injection-molded, or liquid crystal polymer (LCP), which is particularly heat resistant, which is recommended when soldering on the printed circuit board is expected to be performed. The material further comprises an organometallic additive, integrated into the polymeric plastic material, which is distributed at least across the skin of the armature, or even at the heart. The organometallic additive, in a non-activated state, is electrically non-conducting. The armature 1 is thus electrically non-conducting and non-magnetic, except possibly for any activated part of the organometallic additive, as discussed hereinafter.

As shown in FIGS. 1 and 2, structurally, the armature 1 extends along the guiding trajectory L7 and advantageously has a general shape of closed loop, or more generally an annular shape, delimiting at the center thereof, the opening 7, which crosses through. The armature 1 comprises two support arms 4 and two attachment arms 5. In the present example, the two support arms 4 are arranged opposite each other, on either side of the opening 7, so as to delimit the opening. Each support arm 4 extends herein parallel to the direction X1. The two attachment arms 5 are arranged opposite each other in front of the opening 7, so as to delimit the opening. Each attachment arm 5 extends parallel to the direction Y1. Each attachment arm 5 extends herein parallel to the direction Y1. Each attachment arm 5 connects, by the ends thereof, one end of an arm 4 to another end of an arm 4. In other words, along the trajectory L7, around the conductor 6, there is an alternation of arms 4 and arms 5. For the example shown in FIGS. 1 and 2, each arm 4 and 5 has a rectilinear shape, or a curved in shape, for turning around the conductor 6.

Each support arm 4 is designed for receiving one of the windings 2 while each attachment arm 5 is designed for receiving one of the bars 3. In FIG. 1, one of the bars 3 is shown disassembled from the armature 1, while the other bar is shown assembled.

Each winding 2 is formed directly on the surface of the support arm 4 concerned.

In particular, along the trajectory L7, each support arm 4 has a radial outer surface 12, i.e. a surface in the form of a handle around the trajectory L7. At each axial end of the radial surface 12, i.e. at each axial end of the arm 4, the arm 4 comprises a corresponding axial surface 13, i.e. an end surface. Herein, the winding 2 is formed exclusively on the radial surface 12, whereas the two axial surfaces 13 have no winding.

Each winding 2 consists of a corresponding conductor track 10, i.e. electrically conducting with respect to the material forming the armature 1, which is electrically insulating. The component shown in FIGS. 1 and 2 thus comprises two distinct tracks 10, each forming a separate winding 2. Each conductor track 10 is formed on the surface of the support arm 4 which carries same, herein on the radial surface 12. Since each conductor track 10 is very thin, part of one of same is shown in a detailed view D of FIG. 1, on a larger scale.

Since the electrical component includes one or a plurality of conductor tracks 10 formed on the armature 1 made of polymer plastic, the electrical component can be considered to be a molded interconnect device component, or a molded interconnect device sensor.

Structurally, the conductor track 10 forms a continuous flat wire, preferentially without branching, laid flat on the outer surface of the arm 4. The conductor track 10 is wound in a spiral around the arm 4, so as to form a succession of turns forming the winding 2. The turns are distributed successively along the trajectory L7, preferentially in a regular manner. Each turn encircles a part of the trajectory L7. In other words, the turns are herein distributed parallel to the direction X1, whereas each turn is preferentially approximately inscribed in a plane parallel to the directions Y1 and Z1. Since the track 10 is formed directly on the surface of the arm 4, it is the shape of the radial surface 12 which determines the geometry of the cross-section of each turn and thus the envelope of the winding 2. In particular, for each turn, the cross-section of the turn corresponds to the outer contour of the cross-section of the arm 4. Here, each arm 4 advantageously has a tubular shape, or more generally a bulk shape, which encircles the trajectory L7. As a result, the winding 2 is a bulk in the directions Y1 and Z1, and can easily have turns of which cross-section covers a large area and has any desired shape. Turns with a circular or elliptical cross-section can advantageously be formed, as is the case in the example shown. Alternatively, it could be provided for that the turns have a square or rectangular cross-section, or any other shape with a desired cross-section, by modifying the shape of the arm 4, more particularly the radial surface 12 thereof.

By virtue of the manufacturing method described below, the track 10 has a track width L10 which can advantageously be less than 400 μm (micrometers), or even less than 200 μm. The pitch P10 of the winding 2, i.e. the distance connecting one turn to the other, is advantageously less than 400 μm, or even less than 200 μm. It is thus possible to obtain a very high density of turns along the trajectory L7, e.g. a plurality of turns per millimeter, as well as a very precise layout of the conductor track 10. In comparison, the cross-section of the winding 2 can be made very large by providing the support arm 4 with any desired shape. In particular, the cross-section of the winding 2 can have a diameter, or otherwise a characteristic size such as a diagonal, which is greater than 3 mm (millimeters), e.g. 5 mm, or even greater than 5 mm. e.g., each turn can have a circumference of about 20 mm. The length of each winding 2, measured along the trajectory L7, can be comprised e.g. between 5 and 15 mm.

Preferentially, the support arm 4 forms a non-magnetic core for the winding 2. If the support arm 4 has a tubular shape, as shown in FIGS. 1 and 2, the quantity of air contained in the tube further has the function of a non-magnetic core.

Preferentially, to form a magnetic circuit along the guiding trajectory L7, the two windings 2 have the turns thereof oriented along the same direction, e.g. the direct direction, i.e. the direction of screwing, along and around the trajectory L7. The result of the above is e.g. that one of the windings 2 has the turns thereof oriented along the direct direction with respect to the direction X1, and that the other winding 2—opposite—has the turns thereof oriented along the direct direction with respect to a direction opposite to the direction X1.

Each bar 3 is made of ferromagnetic material, e.g. a soft iron. Each bar 3 forms a part which is fitted onto the armature 1, unlike the windings 2 which are integrated therein.

Each bar 3 is advantageously in the form of a blade, which extends parallel to the direction Y1. The bar 3 comprises two axial ends 14 and a central part 15 connecting the two axial ends 14 to one another. At each of the ends 14 thereof, the bar 3 is in mechanical contact with one of the axial surfaces 13 of one of the arms 4, parallel to the direction X1, i.e. locally, perpendicular to the trajectory L7. Each bar 3 thus connects an axial end of the first winding 2 with the end of the other winding, without electrical contact with the tracks 10 forming the windings 2, respectively, but as close as possible so as to reduce the air-gap. A loop-shaped magnetic circuit is thus obtained along the trajectory L7, formed by alternating the windings 2 and the bars 3. In operation, magnetic field lines extend along the trajectory L7.

Each attachment arm 5 serves both for supporting the support arms 4, but also for supporting one of the bars 3.

In order to support the support arms 4 in a fixed manner with respect to each other, each attachment arm 5 comprises a yoke 11, which structurally connects the end of one of the arms 4 to the end of the other arm 4. With the arms 4, the yokes 11 delimit the opening 7 of the electrical component. Each yoke 11 advantageously extends parallel to the directions Y1 and Z1. Each yoke 11 is mechanically attached to the two support arms 4. For each arm 4, the yoke 11 is attached to the axial end of the arm 4, or more generally to a zone of the arm 4 that does not include the winding 2. Preferentially, as shown in FIGS. 1 and 2, the occupation of the axial end of the arm 4 by the yoke 11 is as small as possible, so that the axial surface 13, reserved for the contact with the bar 3, is as large as possible.

Each attachment arm 5 advantageously comprises a base 20 which extends parallel to the directions X1 and Y1, so that the bases 20 of the two arms belong to the same plane. Each base 20 is attached to the yoke 11 by a longitudinal edge of said yoke 11, extending parallel to the direction Y1. While the yokes 11 and the arms 4 are all arranged in the same plane which includes the trajectory L7, the bases 20 are arranged in a parallel plane, offset with respect to the plane of the trajectory L7.

In order to position the bar 3 onto the armature 1 along the direction X1, it is advantageously provided for that the ends 14 rest against the surfaces 13 of the support arms 4 and/or for the central part 15 of the bar 3 to rest against the yokes 11. The bar 3 is separated by the yoke 11 from the opening 7.

In order to position the bar 3 onto the armature 1 along the direction Z1, it is advantageously provided that a longitudinal edge 17 of the bar 3 rests against the base 20 of the arm 5 onto which the bar 3 is received.

In order to position the bar 3 on the armature 1 along the direction Y1, the attachment arm 5 and the bar 3 advantageously form a stop including a pin 16, formed herein by the yoke 11 at the intersection between the base 20 and the yoke 11, outside the opening 7, and a notch 19, formed herein by the longitudinal edge 17 of the bar 3. The positioning of the bar is provided by the reception of the pin 16 inside the notch 19.

Optionally, the positioning of the bar 3 parallel to the direction Y1 is provided at least in part by a shape match between the bar 3 and the yoke 11 of the arm 5. As shown in FIGS. 1 and 2, the bar 3 advantageously has an arched shape, wherein the central part 15 extends in a first plane, which is parallel to the directions Y1 and Z1, and where the ends 14 both extend in the same second plane which is parallel to the directions Y1 and Z1, the plane of the ends 14 being offset with respect to the plane of the central part. The yoke 11 mates with such particular shape so as to position the bar 3 parallel to the direction Y1.

To attach the bar 3 onto the armature 1, the arm 5 concerned comprises snap-fitting lugs 18, e.g. two lugs 18. Here, the snap-fitting lugs 18 mate with one of the ends 14, respectively, of the bar 3. For this purpose, the lugs 18 are herein carried at longitudinal ends of the base 20 and each extending along the direction Z1, so as to be each opposite to one of the surfaces 13. The pin 16 is thus arranged between the two lugs 18. Each end 14 advantageously comprises a recess 21 for receiving a protrusion forming a hook, carried by the end of the lug 18. Once snap-fitted, the bar 3 is caught parallel to the direction Z1 between the base 20 and the hook of the lug 18, received in the recess 21. The lugs 18 and the recesses 21 are an example of matching means of snap-fitting formed by the bar 3 and the arm 5.

The attachment of the bar 3 onto the armature is thus particularly easy, since it suffices to slip on the bar 3 along the arm 5 by moving the bar 3 along a direction opposite to the direction Z1 with respect to the armature 1, until the pin 16 is received by the notch 19 and the lugs 18 snap into the recesses 21.

The arrangement of the means for positioning and attaching the bars 3 of the example shown in FIGS. 1 and 2 advantageously allows the arms to have a plurality of symmetries, which make same interchangeable if need be, which in particular facilitates the manufacture of the electrical component. The bar 3 e.g. is symmetrical with respect to a plane parallel to the directions X1 and Y1, so that each bar 3 comprises two symmetrical longitudinal edges 17, each having a symmetrical notch 19. The bar 3 e.g. is symmetrical with respect to a plane parallel to the directions X1 and Z1, so that the ends 14 are interchangeable.

Preferentially, the armature 1 further comprises feet 23, which are better visible on FIG. 2. Four feet 23 are preferentially provided. Herein, each foot 23 is formed protruding from one of the attachment arms 5, in particular from the base 20, while being oriented along a direction opposite to the direction Z1. Each foot 23 is advantageously attached monolithically to the arm 5 which supports same. Each arm 5 comprises, e.g. two feet 23 at the longitudinal ends thereof. It is advantageously provided that, for the same arm 5, the feet are distributed parallel to the direction Y1. For two opposite arms 5, it is advantageously provided for that the feet are to be distributed in pairs, each pair of feet 23 being parallel to the direction X1. Preferentially, each pair of feet 23 is aligned with one of the windings 2.

The electrical component is advantageously designed for being placed on the printed circuit board by means of the attachment arms 5, in particular by means of the bases 20, herein more precisely by resting on the four feet 23.

Preferentially, each winding 2 is electrically connected to the electrical circuit of the printed circuit board via two legs 23. More precisely, each winding 2 has two ends, forming the two terminals of the winding 2 concerned. For each end of the winding 2, a corresponding auxiliary conductor track 24 advantageously connects the end of the winding 2 to the foot 23. Preferably, the track 24 is of the same nature as the conductor track 10 of the winding 2 and obtained by the same method and manufactured at the same time, at the surface of the armature 1. Electrically, the two windings are advantageously connected in series with each other and with a circuit for processing the signal exiting therefrom. Such connections are preferentially made via the electronic circuit board. Advantageously, the connections of the windings 2 and any return tracks can be expected to be formed directly on the electronic circuit board. In particular, for each winding 2, a corresponding return track is provided, which extends under the winding 2 concerned, following the guiding trajectory L7 in the plane of the printed circuit board. Herein, at least a part of each return track is rectilinear and parallel to the direction X1, extending under the winding 2 concerned, from one axial end of the winding 2 to the other. The first winding 2, the first return track, the second return track and the second winding 2 thus follow one another in series.

Preferentially, the armature 1 further comprises studs 22, which can be seen more clearly on FIG. 2. Herein, each stud 22 protrude monolithically from one of the attachment arms 5, in particular protruding from the base 20 opposite the yoke 11. Each stud 22 protrudes in a direction opposite to the direction Z1. Each stud 22 can be advantageously used for positioning and/or attaching the electrical component, in particular along the directions X1 and Y1, on the printed circuit board, which comprises e.g. corresponding holes for receiving the studs 22. For this purpose, the studs 22 are advantageously arranged in the same plane parallel to the directions X1 and Y1 and are oriented along the same direction, herein the direction opposite to the direction Z1.

The electrical component shown in FIGS. 1 and 2 is obtained using the manufacturing method as defined hereinbelow and shown in FIG. 3.

In essence, the manufacturing process successively comprises a supply or a manufacture of the armature 1 shown in box A in FIG. 3, then a laser engraving of the armature 1 shown in boxes B and C of FIG. 3, then a chemical treatment of the armature 1 including a metallization (not shown), then an assembly of the bars 3 onto the armature 1 shown in box D in FIG. 3.

The manufacture of the armature 1 preferentially comprises molding the armature 1 by injecting material into a mold, while the material is in a viscous state. One of the mold cavities 30 is shown schematically in box A in FIG. 3, while knowing that the mold advantageously comprises another mold cavity, and preferentially cores, in particular for producing the tubular shape of the support arms 4. The mold is configured for shaping, in a single molding operation, all the parts of the armature 1, i.e. in particular the arms 4 and 5, the feet 23 and the studs 22.

As shown in FIG. 3 for the mold cavity 30, the mold preferentially comprises chambers 31, 32, 33 and 34, the chambers 31 and 32 being designed for shaping each one of the support arms 4, the chambers 33 and 34 each being designed for shaping one of the attachment arms 5. Like the armature 1, the mold has an annular shape about an axis parallel to the direction Z1. Thus, the chamber 31 connects the chambers 33 and 34, the chamber 32 connects the chambers 33 and 34, the chamber 33 connects the chambers 31 and 32, the chamber 34 connects the chambers 31 and 32.

In the present example, the mold cavities, including the mold cavity 30, are closed parallel to the direction Z1. Thus, the mold cavity 30 forms the underside of the armature 1, including herein the studs 22, the feet 23 and the bases 20, while the other mold cavity (not shown), forms the top of the armature 1.

The mold also comprises two openings 35 and 36 for the injection of the material into the mold, both of which are herein provided in the mold cavity 30. In the present example, the opening 35 exits directly into the chamber 33 and the opening 36 exits directly into the chamber 34. More generally, it is preferred for each opening of the mold to exit into a chamber forming one of the attachment arms 5, or at least into a chamber which does not form one of the support arms 4, the radial surface 12 of which must have a flawless state and the structure of which must withstand laser engraving. Advantageously, the openings 35 and 36 shape the studs 22 of the armature 1. Indeed, the studs 22 are a part of the armature 1 which require lower production precision and mechanical characteristics of lesser quality, in particular with regard to the support arms 4.

For the studs 22 thus obtained to be apt to serve as means for positioning the component on the printed circuit board, provision is advantageously made that the openings 35 and 36 are arranged in the same plane parallel to the directions X1 and Y1 and along the same orientation, herein parallel to the direction Z1, while being carried by the same mold cavity 30.

From the annular arrangement of the chambers 31 to 34, it results that the chamber 33 communicates with the opening 36, along a first direction, only via the chamber 31 and the chamber 34. Along a second direction, the chamber 33 communicates with the opening 36 only via the chamber 32 and the chamber 34. The opening 35 exits directly into the chamber 33. Similarly, the chamber 34 communicates with the opening 35, along a first direction, only via the chamber 32 and the chamber 33. Along a second direction, the chamber 34 communicates with the opening 35 only via the chamber 31 and the chamber 33. The opening 36 exits directly into the chamber 34.

For the molding, due of the annular shape of the mold, provision is made to inject the material both through the two openings 35 and 36, which are located opposite each other, so as to obtain a correct distribution of the material in the mold. A first part 37 of the material is injected through the opening 35, and a second part 38 of the material is injected through the opening 36, simultaneously with the injection of the first part 37.

As shown diagrammatically in box A of FIG. 3, the injection of the part 37 of the material leads to a partial incursion of the chamber 33 by the part 37, to a complete incursion of chamber 31 by the part 37 and by a partial incursion of chamber 34 by the part 37. One of the two support arms 4 is entirely formed by the part 37 of the material in the chamber 31. The injection of the part 38 of the material leads to a partial incursion of the chamber 34 by the part 38, to a complete incursion of the chamber 32 by the part 38 and to a partial incursion of the chamber 33 by the part 38. The other support arm 4 is entirely formed by the part 38 of the material in the chamber 32. One of the studs 22 is shaped by the opening 35, being entirely formed by the part 37 of the material. The other stud 22 is shaped by the opening 36, being entirely formed by the part 38 of the material.

Each part 37 and 38 of the material extends into the chambers 33 and 34, where the parts 37 and 38 meet. Each chamber 33 and 34 thus serves as a joining chamber between the parts 37 and 38 of the material. In the chamber 33, the joining between the parts 37 and 38 of the material takes place at a welding plane 39. In the chamber 34, the joining between the parts 37 and 38 of the material takes place at a welding plane 40. Each arm 5 is thus formed by the combination of the two parts 37 and 38 of the injected material. The armature 1, in particular the arms 4 and 5, is formed in one piece with the same material injected at one time into the same mold, although in two parts 37 and 38.

More generally, the mold is advantageously configured so that the possible welding planes 39 and/or 40 form outside the chambers 31 and 32, e.g. in the chambers 33 and/or 34. In the finished armature 1, the possible welding planes are thus situated outside the support arms 4, which gives same all the production resistance and precision needed for the subsequent operations aimed at forming the tracks 10. In the present example, the possible sealing surfaces are formed at the attachment arms 5, the qualities of which are less critical than the qualities of the support arms 4.

Once the armature 1 was manufactured as described above, the armature 1 is engraved by laser, as shown in boxes B and C in FIG. 3. In particular, for each support arm 4, a corresponding initiator track is laser-engraved, which will later serve as the basis for forming the conductor track 10 of the support arm 4. If it is desired to produce the aforementioned auxiliary conductor tracks 24, corresponding auxiliary initiator tracks are also formed during such step, according to the same method as for the initiator tracks intended for forming the conductor tracks 10.

The material of the armature 1 is specially designed for forming the initiator track 50 by laser engraving, e.g. using any appropriate laser engraver 51. The term "laser engraver" refers e.g. to an apparatus comprising both a source of a laser beam, means for orienting the laser beam, e.g. a set of orientable mirrors, and means for focusing the laser beam, such as a set of lenses.

Using the laser locally on the surface of the material leads to the formation of the initiator track 50, which can be drawn, with any desired layout, by using the laser. The initiator track 50 differs from the rest of the surface of the armature 1 in that same consists of activated parts of the organometallic additive, whereas the organometallic additive is in a non-activated state for the rest of the armature 1. In addition, the initiator track differs from the rest of the surface of the armature 1 in that same forms a groove, or at least in that same has a more abrasive surface condition.

Preferentially, the organometallic additive is formed by a metal complex comprising a metal core, e.g. a copper core, which, in the non-activated state, is covalently bonded to the polymeric plastic material. Such organometallic additive is apt to be activated selectively, on the surface of the armature, by local and selective application of appropriate laser radiation, e.g. pulsed infrared laser radiation. To activate the organometallic additive, the laser radiation breaks the complex, releasing the metal core only where the radiation is applied. More precisely, the laser leads to a metal reduction in the complex, the core then being in metallic form, herein metallic copper. Furthermore, the laser radiation locally heats the surface of the material and causes a local increase in surface roughness by partial ablation of the polymeric plastic material.

For each arm 4, the laser engraving aims to form the initiator track 50 on the arm 4 so that the initiator track 50 has exactly the same layout as the conductor track 10 which is desired to be formed. Consequently, for each arm 4, the initiator track 50 is arranged on the outer surface of the arm 4, in particular only on the radial surface 12. The initiator track 50 is wound in a spiral around the arm 4 so as to form a succession of turns which will form the winding 2 at a subsequent step of the process.

For performing the laser engraving, two successive substeps are preferentially performed, as shown in boxes B and C, respectively.

Each support arm 4 is divided into a side 52 and a side 53 which are opposite and contiguous on either side of the guiding trajectory L7. The side 52 forms a part, e.g. half, of the surface 12, while the other side 53 forms the other part of the surface 12. The combination of the two sides 52 and 53 forms the entire surface 12. The sides are e.g. separated by a median plane of the arm 4, oriented parallel to the directions X1 and Y1.

Firstly, as shown in box B, the armature 1 is positioned so that the side 52 is oriented facing the laser engraver 51. In other words, the armature 1 is arranged so that the side 52 can be engraved by the laser engraver 51. In such orientation, the laser engraving of a first part 54 of the initiator track 50 is performed only on the first side 52. The part 54 thus engraved begins the formation of all the turns of the initiator track 50, by forming for each turn, only a first part of said turn, while the second part of the turn remains to be engraved. Half-turns are engraved on the side 52 of the arm 4, as shown in box B. Once the side 52 has been engraved, the armature 1 is repositioned so that the side 53 is oriented facing the laser engraver 51. A second part 55 of the initiator track 50 can then be engraved on the side 53, so as to complete the first part 54, as shown in box C. The second part 55, occupying the side 53, consists in forming for each turn, the portion matching the portion formed by the first part 54. The combination of the two parts 54 and 55 thus forms the entire initiator track 50.

The auxiliary initiator tracks are also formed during one of such steps, e.g. while the armature is in the position shown in box C.

To change from side 52 to side 53, it is preferred that the armature 1 is turned over, e.g. by a person or by a robotic arm, while the position of the laser engraver 51 is not changed, except for a simple orientation of the laser beam for drawing the initiator track 50.

Preferentially, once the laser engraving was carried out, the armature 1 is cleaned so to remove any debris caused by such operation.

The engraved initiator tracks 50 and any possible auxiliary initiator tracks are not sufficiently electrically conducting for the electrical component to work. The armature 1 is thus chemically treated so as to grow the conductor tracks.

The chemical treatment consists first of all of metallizing the initiator tracks 50 for forming the conductor tracks 10 and any auxiliary conductor track 24, directly on the surface of the armature 1. The metallization leads to a growth of the initiator tracks, while the rest of the surface of the armature 1 remains electrically insulating.

The term "metallization" refers e.g. to an autocatalytic metallization. The armature carrying the initiator tracks is immersed in a solution comprising metal ions of the metal with which it is desired to form the conductor tracks, e.g. copper. The solution comprises e.g. a metal salt containing the metal ions, herein copper ions, a reducing agent for reducing the metal ions. By a redox reaction, the metal of the metal ions is deposited only on the initiator tracks without being deposited on the rest of the surface of the armature 1, the initiator tracks being a catalyst for the redox reaction. The metal layer deposited by such process is a catalyst for the deposition of more metal by a redox reaction. In this way, the conductor tracks grow through the metallization. Mechanically, the conductor tracks thus formed are strongly rigidly attached to the polymer plastic material by the mechanical anchoring thereof to the asperities formed by the abrasive character of the surface of the armature 1, due to the laser engraving.

Preferentially, once the conductor tracks have been formed by metallization, the chemical treatments include the deposition of finishing layers for protecting the conductor tracks. For this purpose, e.g. an ENIG (Electroless Nickel Immersion Gold) process is used. For this purpose, a nickel-phosphorus layer is first applied by autocatalytic metallization on the free face of the conductor tracks, i.e. the face opposite the surface of the armature 1. Such autocatalytic metallization is advantageously performed after the copper conductor tracks have been activated with palladium. Then, an external gold layer is applied, e.g. by chemical shift. The gold layer prevents the oxidation of the coated conductor tracks, while the nickel-phosphate layer prevents the migration of gold to copper.

At the end of the chemical treatments for forming the conductor tracks, the bars 3 are attached to the armature 1, namely to the attachment arms 5, as shown in box D in FIG. 3. The bars are attached herein by snap-fitting using snap-fitting lugs 18, once the armature 1 has been molded and coated with the conductor tracks. In the present example, to perform such attachment, the bar 3 is slipped onto the arm 5 by moving the bar 3 along a direction opposite to the direction Z1 with respect to the armature 1, until the pin 16 is received by the notch 19 and the lugs 18 snap into the recesses 21.

The component is then advantageously finished.

In a variant, a single support arm 4 could be provided carrying a winding 2, without any attachment arm 5 and thus without any bar, the support arm 4 and the winding 2 thereof extending over all or most of the guiding trajectory L7. In such a case, the single support arm 4 and the winding thereof would have the shape of a loop, or at least the shape of a "C". As a variant, there could be a single support arm 4 carrying a single winding 2 and a single attachment arm 5 carrying a single bar 3, the attachment arm 5 connecting therebetween the ends of the support arm 4. As a variant, more than two support arms 4 may be provided, carrying as many windings 2, and, if appropriate, more than two attachment arms 5, carrying as many bars 3. It is advantageously provided that, along the guiding trajectory L7, two successive support arms 4, each carrying a corresponding winding 2, are separated by an attachment arm 5 carrying a bar 3. However, it is possible to provide two immediately successive support arms 4, each carrying a corresponding winding 2.

The electrical component of the embodiment shown in FIG. 4, as well as the manufacturing method thereof, are identical to the electrical components of the embodiment of FIGS. 1 to 3, except for the differences mentioned hereinbelow. In particular, the electrical component of FIG. 4 comprises an armature 1, two windings 2, carried by two support arms 4, respectively, of the armature 1, and two bars 3, carried by two attachment arms of the armature 1. The same reference signs are used for similar elements between the embodiment shown in FIGS. 1 to 3 and the embodiment shown in FIG. 4.

Figure 4:
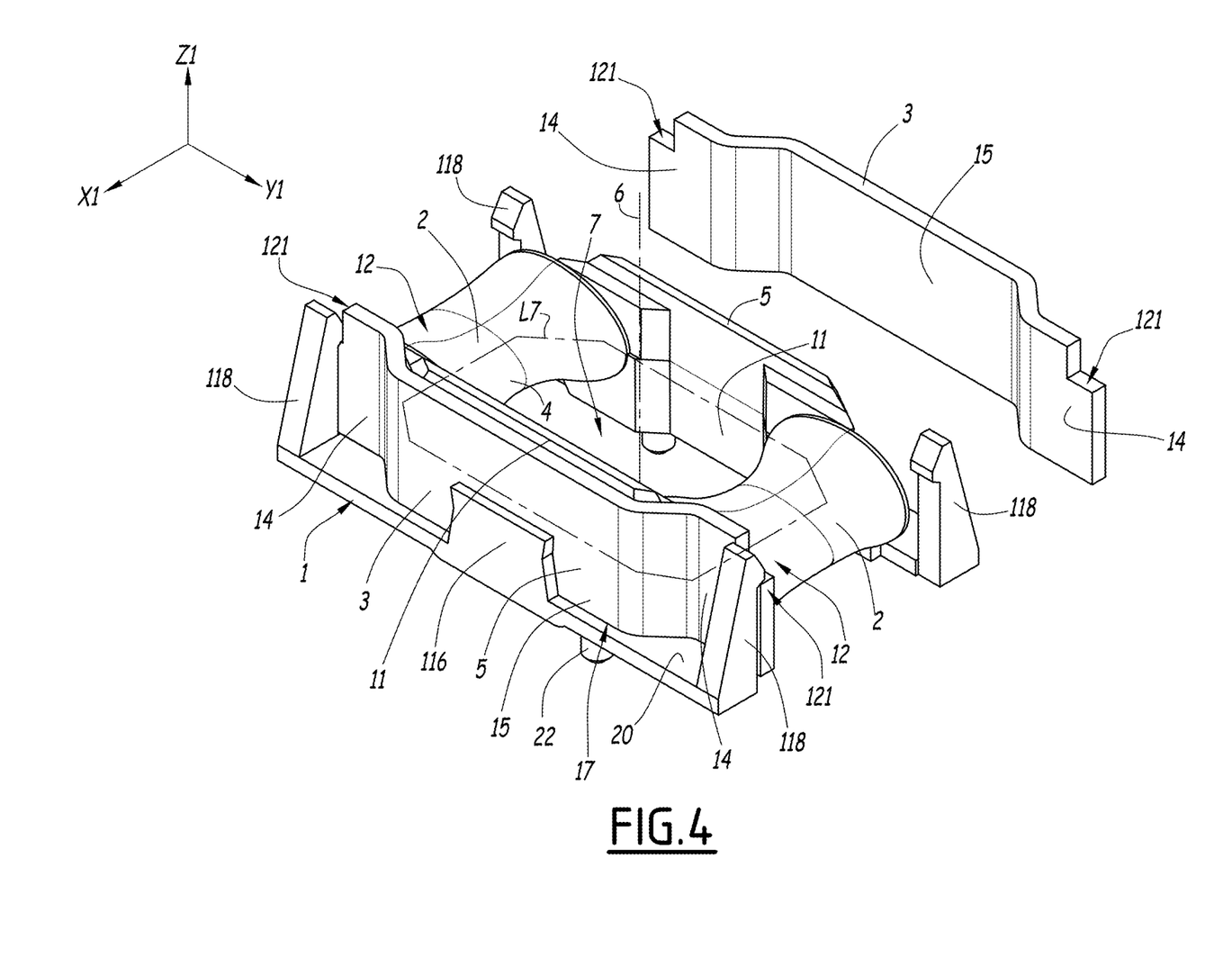
FIG. 4 is a perspective view of an electrical component according to a second embodiment according to the invention.

Unlike the embodiment shown in FIGS. 1 to 3, the embodiment shown in FIG. 4 provides that each arm 5 comprises snap-fitting lugs 118, instead of lugs 18, which have a double function, in that same ensure both the snap-fitting and the positioning of the bar 3 concerned, parallel to the direction Y1. Herein, each snap-fitting lug 118 correspondingly mates with a notch 121, provided e.g. in the corner of one of the ends 14 of the bar 3, both for snap-fitting and for the positioning parallel to the direction Y1. It is not necessary to provide the recesses 21. Each arm 5 includes two lugs 118, carried at longitudinal ends of the base 20 and each extending along the direction Z1. Each bar 3 has two notches 121 corresponding to the two lugs 118. Each notch has a face parallel to the directions Z1 and X1, resting against the lug 118 so as to provide the positioning parallel to the direction Y1. Each notch 121 has a face parallel to the directions X1 and Y1, which allows the bar 3 to be caught between a hook formed at the end of the lug 118 and the base 20, parallel to the direction Z1, so as to achieve the snap-fitting of the bar 3.

In such embodiment, the pin 16 and the notch 19 are not needed.

In order to reinforce the positioning of the bar 3, the attachment arm 5 advantageously comprises a stabilizing blade 116 which is attached to the base 20 by protruding therefrom along the direction Z1. The blade 116 is arranged between the two lugs 118 so as to come into contact with the central part 15 of the bar 3. The central part 15 of the bar is thus slipped on between the blade 116 and the yoke 11 of the arm 5, so as to be caught parallel to the direction X1. Preferentially, provision is made that the central part 15 of the bar 3 is nipped between the yoke 11 and the blade 116. The blade 116 takes up part of the forces applied to the bar 3 parallel to this direction, which reduces the risk of breakage of the lugs 118.

The electrical component of the embodiment shown in FIG. 5, as well as the manufacturing method thereof, are identical to the electrical components of the embodiment of FIGS. 1 to 3, except for the differences mentioned hereinbelow. In particular, the electrical component of FIG. 5 comprises an armature 1, two windings 2, carried respectively by two support arms 4 of the armature 1, and two bars 3, carried by two attachment arms of the armature 1. The same reference signs are used for similar elements between the embodiment shown in FIGS. 1 to 3 and the embodiment shown in FIG. 5.

Figure 5:
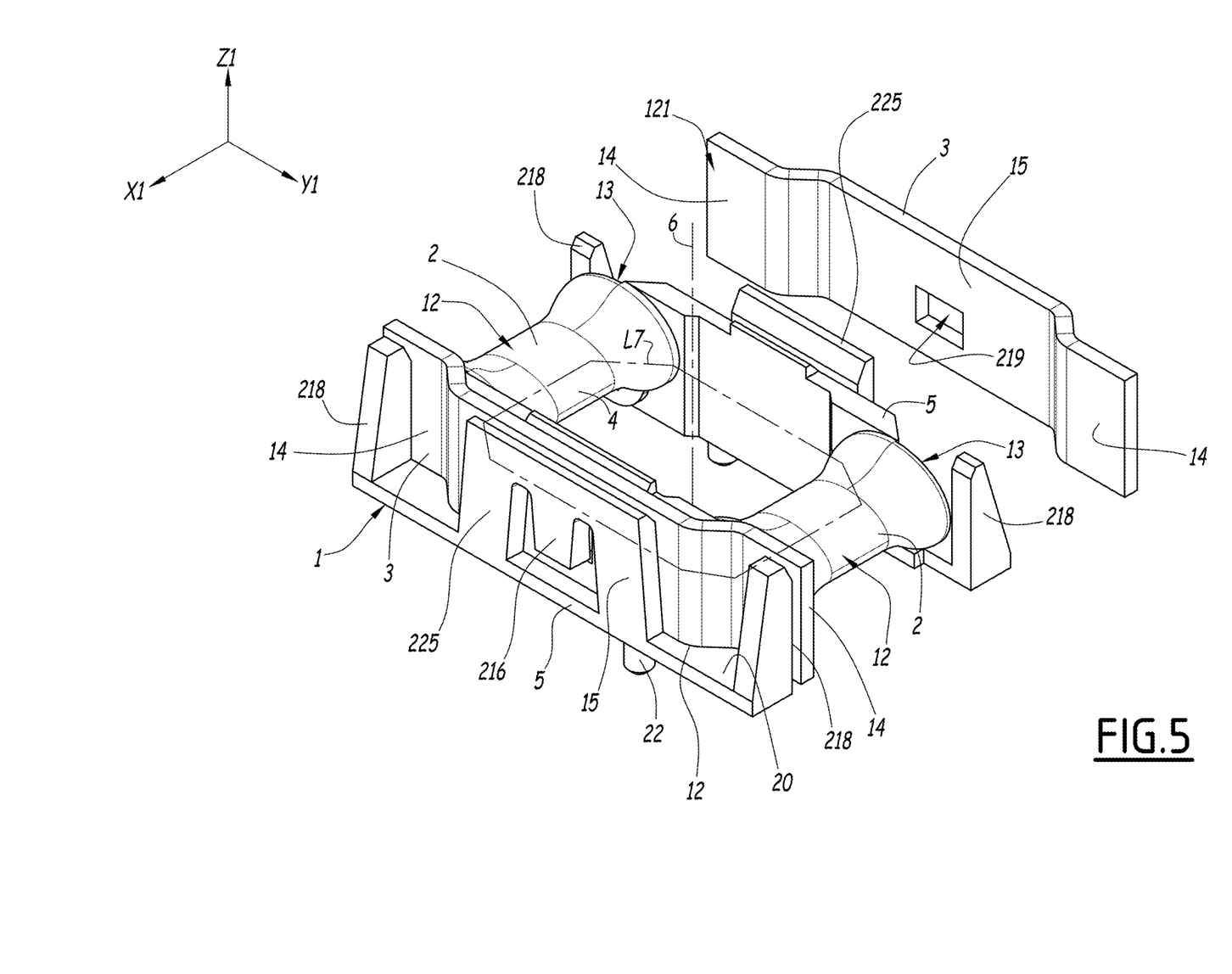
FIG. 5 is an exploded perspective view of an electrical component according to a third embodiment according to the invention.

Unlike the embodiment shown in FIGS. 1 to 3, the embodiment shown in FIG. 5 provides that each arm 5 comprises holding lugs 218, instead of the snap-fitting lugs 18. Each arm 5 comprises, e.g., two holding lugs 218 which protrude from the base 20 along the direction Z1 at the longitudinal ends of the base 20. Each end 14 of the bar 3 is positioned, parallel to the direction X1, between one of the lugs 218 and the axial surface 13 of the support arm 4, being slipped on, preferentially without snap-fitting, between the lug 218 and the axial surface 13. It is thus not necessary to provide the recesses 21 or the notches 121.

In the embodiment shown in FIG. 5, the bar 3 does not have the notch 19 and the arm 5 does not have the pin 16. Instead, the arm 5 advantageously comprises a snap-fitting lug 216, which mates with a snap-fitting opening 219 which crosses through the central part 15 of the bar 3. The snap-fitting lug 216 is advantageously arranged between the lugs 218. In order to have good mechanical resistance, the snap-fitting lug 216 is e.g. attached to the base 20 by means of a gate 225, but could alternatively protrude directly from the base 20 in a similar manner to the lugs 18 shown in FIGS. 1 and 2. The gate 225, which is arranged between the lugs 218, further provides a function similar to the function of the lugs 218, since the central part 15 is slipped on between the gate 225 and the yoke 11, which positions the bar 3 parallel to the direction X1. The combination of the lugs 218, of the gate 225 and of the arched shape of the bar 3, matching the shape of the yoke 11, provides the positioning of the bar parallel to the direction Y1. The snap-fitting lug 216 of the arm 5 is received in the opening 219 of the bar 3, which attaches the bar 3 to the arm 5 by snap-fitting.

The electrical component of the embodiment shown in FIG. 6, as well as the manufacturing method thereof, are identical to the electrical components of the embodiment of FIGS. 1 to 3, except for the differences mentioned hereinbelow. In particular, the electrical component of FIG. 6 comprises an armature 1, two windings 2, carried respectively by two support arms 4 of the armature 1, and two bars 3, carried by two attachment arms of the armature 1. The same reference signs are used for similar elements between the embodiment shown in FIGS. 1 to 3 and the embodiment shown in FIG. 6.

Unlike the embodiment shown in FIGS. 1 to 3, the embodiment shown in FIG. 6 does not provide any snap-fitting of the bars 3, but instead provides an attachment of the bars by snap-riveting, as explained hereinbelow. This results in a simplified design for the bars 3 and the arms 5. On the other hand, the material of the armature 1 has to be compatible with the snap-riveting, i.e. has to be re-meltable. Provision should be made e.g. that the polymeric plastic material of the armature 1, or at least of the arms 5, is thermoplastic.

Figure 6:
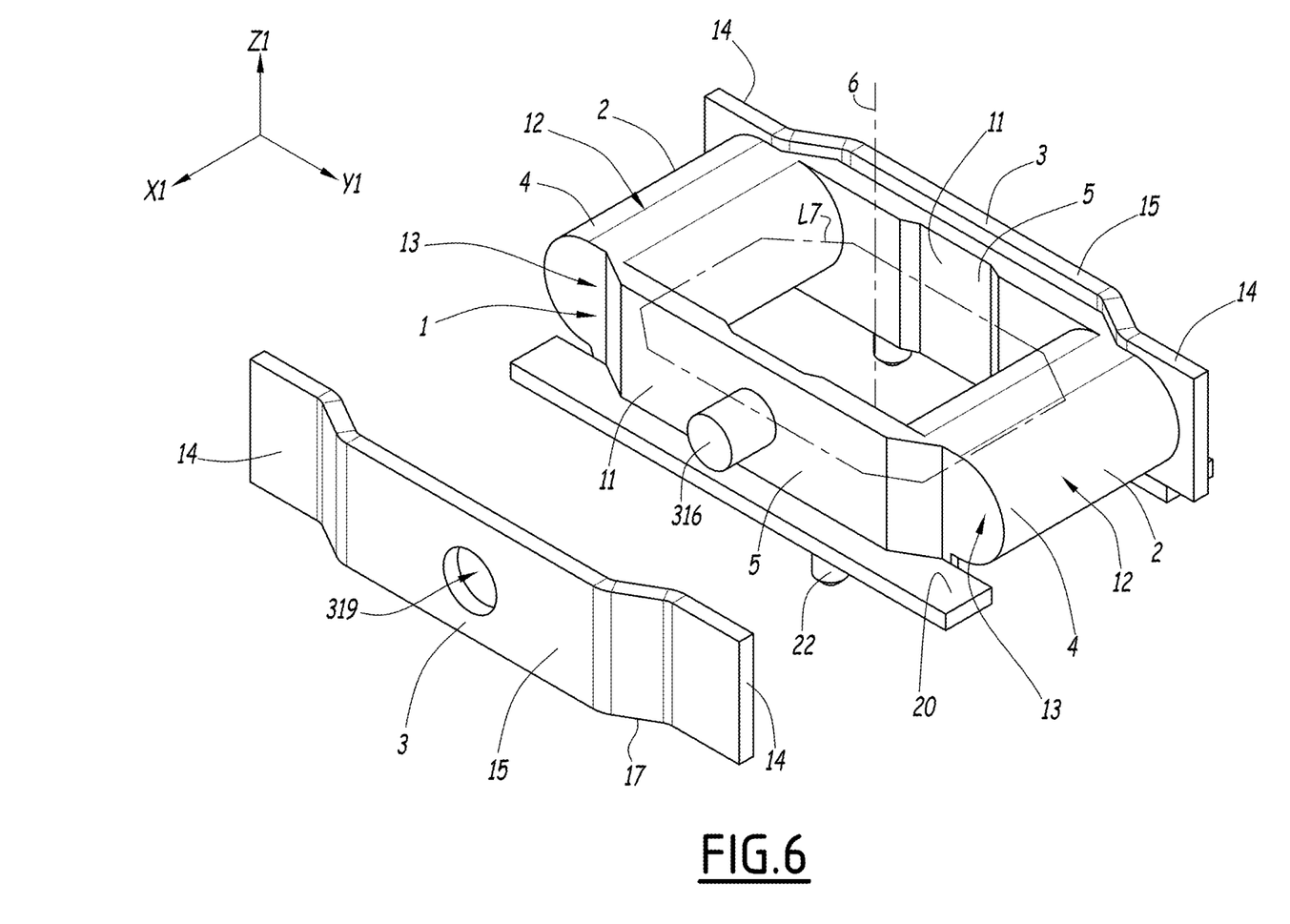
FIG. 6 is an exploded perspective view of an electrical component according to a fourth embodiment according to the invention.

As shown in FIG. 6, the bar 3 has no recesses 21 and no notches 19. The bar 3 is provided, preferentially through the central part 15 thereof, with a snap-riveting hole 319, crossing through the bar 3 parallel to the direction X1.

As shown in FIG. 6, the arm 5 has no lugs 18 and no pin 16. The arm 5 is provided, preferentially protruding from the yoke 11 parallel to the direction X1, with a snap-riveting pin 316, matching the hole 319. In addition to the positioning of the bar 3 performed using the base 20 and the yoke 11, the bar 3 is positioned on the snap-riveting pin 316 using the snap-riveting hole 319, parallel to the direction X1.

In order to assemble the bar 3 on the armature 1 for the embodiment shown in FIG. 6, the bar 3 is slipped onto the pin 316, the pin 316 being received in the hole 319 of the bar 3, while positioning the bar 3 on the arm 5 of the armature 1, e.g., with the edge 17 of the bar guided by the base 20 and the bar 3 resting against the yoke 11.

Then, the bar 3 thus positioned is attached onto the attachment arm 5 by snap-riveting, which involves heating the pin 316, leading to a localized melting of the material of the armature, so as to form a neck at the end of the pin 316. Once the pin 316 has solidified with the neck thereof, the bar 3 is caught parallel to the direction X1 between said neck and the yoke 11. The bar 3 is then permanently attached to the armature 1.

This method of attachment the bar 3 has the advantage that the connection between the bar 3 and the armature 1 is very resistant and irreversible, and that the bar 3 can have the same symmetries as for the embodiment shown in FIGS. 1 to 3, so that same can be mounted indifferently on one side or the other of the armature 1 during the manufacture of the component.

Figure 7:
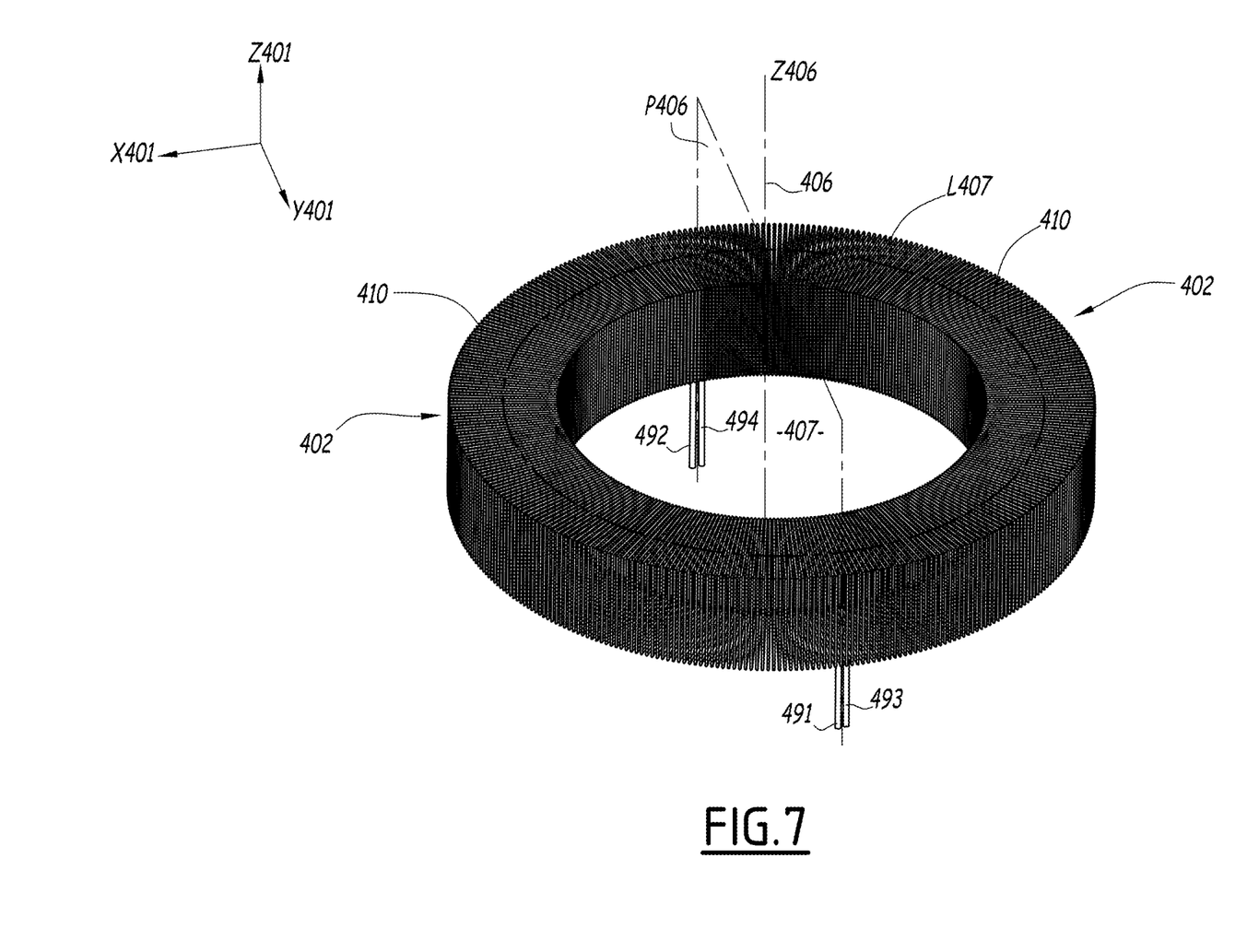
FIG. 7 is a perspective view of an electrical component according to a fifth embodiment according to the invention.

The manufacturing method described for the embodiments shown in FIGS. 1 to 6 can be applied to the electrical component of the embodiment shown in FIG. 7. Such electrical component comprises two windings 402 and an armature (not shown).

A reference mark is used including a longitudinal direction X401, a transverse direction Y401 and a height direction Z401, perpendicular to each other and fixed with respect to the armature of the electrical component of FIG. 7.

The component shown in FIG. 7 is preferentially a current sensor. The value of the current of a conductor 406 can be determined using the electrical component, when the conductor crosses through a guiding trajectory L407 defined by the component, with the shape of a closed loop, which is herein circular, being centered on an axis Z406 parallel to the direction Z401. In practice, the armature of the component delimits an opening 407 of the component, in the same plane, parallel to the directions X401 and Y401, as the guiding trajectory L407 and being surrounded by the guiding trajectory L407, through which the conductor 406 can be fitted. Preferentially, such component is a Rogowski sensor and the induced voltage depends on the value of the variation of the current flowing through the opening 407.

Such component is intended for being connected to an electronic system for sensors, including a conditioning electronic system e.g. in the form of an integrator circuit.

The armature is a single one-piece with annular shape, forming a circular crown about the axis Z406, following the trajectory L407, entirely made of the same material as the material of the armature 1 described hereinabove.

The component has a symmetrical structure with respect to a plane P406 comprising the axis Z406 and parallel to the direction Y401.

The armature comprises two support arms. The armature has no attachment arms, the component not comprising any bar.

For the embodiment shown in FIG. 7, a first support arm forms a first part, herein half of the armature, extending along the trajectory L407 on a first side of the plane P406. The other support arm extends symmetrically on the other side of plane P406. Each support arm thus has the shape of a portion of a crown. Herein, each support arm has a square cross-section, but any desired shape of cross-section could be provided. The support arms are attached to each other by the two ends thereof so that the armature has the shape a closed loop about the axis Z406.

Each support arm receives one of the windings 402, formed directly on the surface of the corresponding support arm thereof by a corresponding conductor track 410. The component thus comprises two distinct tracks 410, each forming a winding 402 separate from the other winding 402. Each conductor track 410 is produced by the same method as the conductor tracks 10 of the components shown in FIGS. 1 to 6. In particular, for each winding 402, a laser engraving of an initiator track is performed on the support arm concerned, for drawing the layout of the future conductor track 410. The armature is then metallized for forming the two conductor tracks only at the location of the two initiator tracks engraved on the support arms.

Each conductor track 410 is wound in a spiral around the corresponding support arm thereof, so as to form a succession of turns forming the winding 402 concerned. The turns are distributed successively along the trajectory L407, preferentially in a regular manner. Each turn encircles a part of the trajectory L407, so that each winding 402 extends over the entire part of the trajectory extending on the same side of the plane P406. Since each track 410 is formed directly on the surface of the corresponding support arm thereof, it is the contour of the cross-section of the support arm, herein with square shape, which determines the geometry of the cross-section of each turn and thus the envelope of the winding 402.

In the present example, the two windings 402 have the turns thereof oriented in opposite directions. One of the windings 402 has e.g. the turns thereof along the direct direction along the trajectory L407, while the other winding has the turns in the indirect direction thereof. Preferentially, each support arm forms a non-magnetic core for the winding 402 thereof.

The component further comprises means for electrically connecting the windings 402. The first winding 402 has a terminal 491 and a terminal 492, positioned at the ends of the winding 402, at the plane P406. The second winding 402 has a terminal 493 and a terminal 494, at the plane P406. Such different terminals 491 to 494 are preferentially intended for being connected and routed via tracks of a printed circuit board on which the component is designed for being positioned.

The terminal 491 is provided e.g. for forming a first terminal of the component intended for being connected to a signal processing circuit. The terminal 492 is connected to a first return track formed on the printed circuit board, the first return track extending under the winding 402 carrying the terminal 492 following the guiding trajectory L407, in the opposite direction to the winding, until reaching the terminal 493, so that the first return loop connects in series, the first winding 402 to the second winding 402. The terminal 494 is connected to a second return track, formed on the printed circuit board, the second return track extending under the winding 402 carrying the terminal 494, symmetrically to the first return track with respect to the plane P406 following the guiding trajectory L407, in the opposite direction to the winding 402. The opposite end of the second return track forms the second terminal of the component. The first winding 402, the first return track, the second winding 102 and the second return track thus follow one another in series.

A manufacturing method is used for manufacturing the component shown in FIG. 7, comprising a supply or a manufacture, preferentially by molding, of the armature, then a laser engraving of the support arms of the armature so as to form the initiator tracks according to the layout of the future windings 402, then finally chemical treatments, including a metallization of the initiator tracks for growing the conductor tracks 410 forming the windings 402. In particular, like for the case shown in FIG. 3, boxes B and C, the laser engraving of the armature of the embodiment shown in FIG. 7 can be carried out in two steps by turning the component upside down.

Any feature described hereinabove for one embodiment or a variant can be implemented for the other embodiments and variants described hereinabove.

The invention claimed is:

1. A method for manufacturing an electrical component, the electrical component comprising:
 an armature, which comprises a material comprising a polymeric plastic material and an organometallic additive, the armature comprising a support arm which extends along a guiding trajectory; and
 a winding, which is formed directly on a surface of the support arm by a conductor track-forming turns of the winding, which are distributed along the guiding trajectory and which encircle the guiding trajectory;
 the method for manufacturing the electrical component comprising successively:
  laser engraving of the support arm of the armature, thereby engraving an initiator track shaped like the turns of the winding and thereby activating the organometallic additive locally at the initiator track; and
  metallizing the initiator track with a conducting metal so as to grow the conductor track directly onto the surface of the support arm, from the turns formed by the initiator track.

2. The manufacturing method according to claim 1, wherein:
 the support arm comprises a first side and a second side which are opposite and contiguous on either side of the guiding trajectory; and
 the laser engraving comprises:
  laser engraving of a first part of the initiator track on the first side, the first part of the initiator track forming, for each turn, only a first portion of the initiator track, and
  laser engraving of a second part of the initiator track on the second side, only after the engraving of the first part of the initiator track, the second part of the initiator track forming, for each turn, a second portion of the turn completing the first portion of said turn.

3. The manufacturing method according to claim 2, wherein the laser engraving comprises:
 positioning of the armature so that the first side is oriented facing a laser engraver, so that the laser engraving of the first part of the initiator track is performed by the laser engraver; and
 repositioning of the armature so that the second side is oriented facing the laser engraver, so that the laser engraving of the second part of the initiator track is carried out by the laser engraver.

4. The manufacturing method according to claim 1, wherein the method comprises molding of the armature by injecting the material into a mold, prior to the laser engraving of the support arm.

5. The manufacturing method according to claim 4, wherein:
 the mold comprises:
  a shaping chamber, for shaping the support arm;
  a first opening, for injecting a first part of the material;
  a second opening, for injecting a second part of the material; and
  a joining chamber, into which the second opening exits and which communicates with the first opening via the shaping chamber of the support arm; and
 the injection molding comprises:
  injecting the first part of the material into the mold through the first opening such that the first part of the material:
   fills up the shaping chamber of the support arm, the support arm then being entirely formed by the first part of the material;
   extends into the joining chamber;
  injecting the second part of the material into the mold through the second opening in such a way that the second part of the material meets the first part of the material in the joining chamber, the armature being formed by combining the first part of the material and the second part of the material.

6. The manufacturing method according to claim 5, wherein the first opening and the second opening are arranged in a same plane and along a same orientation, so that:
 the first opening shapes a first stud of the armature, by injecting the first part of the material; and
 the second opening shapes a second stud of the armature, by injecting the second part of the material, the first stud and the second stud being configured for achieve a positioning of the electrical component on a printed circuit board.

7. The manufacturing method according to claim 4, wherein
 the manufacturing method comprises:
  attaching a bar of ferromagnetic material on an attachment arm belonging to the armature; and wherein the molding comprises forming the support arm and the attachment arm in the mold so that the support arm and the attachment arm are formed monolithically.

8. The manufacturing method according to claim 7, wherein the attaching of the bar comprises snap-fitting the bar on the attachment arm, using matching snap-fitting means belonging to the bar and to the attachment arm.

9. The manufacturing method according to claim 7, wherein the attaching of the bar comprises:
   positioning of the bar onto the attachment arm, including inserting a snap-riveting pin belonging to the attachment arm into a snap-riveting hole crossing through the bar; and
   attaching of the bar thus positioned onto the attachment arm by snap-riveting of the snap-riveting pin.

10. The manufacturing method according to claim 1, wherein the electrical component is a current sensor.

* * * * *